US011102819B2

(12) United States Patent
Zhang et al.

(10) Patent No.: US 11,102,819 B2
(45) Date of Patent: Aug. 24, 2021

(54) JOINT LOW-BAND AND HIGH-BAND OPERATION IN NR-SS

(71) Applicant: QUALCOMM Incorporated, San Diego, CA (US)

(72) Inventors: Xiaoxia Zhang, San Diego, CA (US); Rahul Malik, San Diego, CA (US); Srinivas Yerramalli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 83 days.

(21) Appl. No.: 16/228,341

(22) Filed: Dec. 20, 2018

(65) Prior Publication Data

US 2019/0208549 A1 Jul. 4, 2019

Related U.S. Application Data

(60) Provisional application No. 62/613,613, filed on Jan. 4, 2018.

(51) Int. Cl.
*H04W 74/08* (2009.01)
*H04W 48/16* (2009.01)
(Continued)

(52) U.S. Cl.
CPC ....... *H04W 74/0833* (2013.01); *H04L 5/0094* (2013.01); *H04W 16/14* (2013.01);
(Continued)

(58) Field of Classification Search
None
See application file for complete search history.

(56) References Cited

U.S. PATENT DOCUMENTS

| 9,730,250 B2 | 8/2017 | You et al. |
| 2011/0075629 A1 | 3/2011 | Seo et al. |

(Continued)

OTHER PUBLICATIONS

Huawei et al., "Low frequency assisted high frequency operation on initial access", 3GPP Draft; R1-1609448, 3rd Generation Partnership Project (3GPP), Mobile Competence Centre, 650, Route Des Lucioles, F-06921 Sophia-Antipolis Cedex, France, vol. RAN WG1, No. Lisbon, Portugal; Oct. 10, 2016-Oct. 14, 2016 Oct. 9, 2016 (Oct. 9, 2016), XP051149490, Retrieved from the Internet: URL:http://www.3gpp.org/ftp/Meetings_3GPP_SYNC/RAN1/Docs/ [retrieved on Oct. 9, 2016], 5 pages.

(Continued)

*Primary Examiner* — Christopher T Wyllie
(74) *Attorney, Agent, or Firm* — Norton Rose Fulbright LLP

(57) ABSTRACT

A joint low-band and high-band operation is disclosed for use in new radio (NR) shared spectrum (NR-SS) networks. In such networks, uplink and downlink communications may occur over separate bands, selected based on performance or quality characteristics. A user equipment (UE) may search each of one or both of a low-band spectrum and a high-band spectrum for system information signal that includes both a low-band random access configuration and a high-band random access configuration. The UE transmits a random access request on one of the bands and receives the random access response from one or more cells on the other band. The UE continues the random access procedure, transmitting the uplink message based on the random access response on the first band to a selected cell. The UE would then receive the contention resolution message from the selected cell on the second band.

30 Claims, 9 Drawing Sheets

(51) Int. Cl.
  *H04W 16/14*      (2009.01)
  *H04L 5/00*       (2006.01)
  H04W 88/02       (2009.01)
  H04W 48/10       (2009.01)
  H04B 7/06        (2006.01)

(52) U.S. Cl.
  CPC ........... *H04W 48/16* (2013.01); *H04B 7/0617* (2013.01); *H04L 5/005* (2013.01); *H04L 5/0048* (2013.01); *H04W 48/10* (2013.01); *H04W 88/02* (2013.01)

(56) References Cited

U.S. PATENT DOCUMENTS

| | | | |
|---|---|---|---|
| 2016/0227575 A1* | 8/2016 | Furuskog | H04W 72/1268 |
| 2017/0223744 A1* | 8/2017 | Qian | H04W 16/28 |
| 2017/0251460 A1* | 8/2017 | Agiwal | H04W 72/0406 |
| 2018/0255468 A1* | 9/2018 | Huang | H04W 72/0413 |
| 2018/0343595 A1* | 11/2018 | da Silva | H04B 7/0695 |
| 2019/0045395 A1* | 2/2019 | Wu | H04W 28/065 |
| 2019/0045481 A1* | 2/2019 | Sang | H04B 1/713 |
| 2019/0069228 A1* | 2/2019 | Malik | H04L 5/005 |
| 2019/0104549 A1* | 4/2019 | Deng | H04B 7/0617 |
| 2019/0182682 A1* | 6/2019 | Kim | H04W 16/28 |
| 2019/0208549 A1* | 7/2019 | Zhang | H04W 48/16 |
| 2019/0223124 A1* | 7/2019 | Tang | H04W 74/0833 |

OTHER PUBLICATIONS

International Search Report and Written Opinion—PCT/US2018/067249—ISA/EPO—Mar. 11, 2019.

* cited by examiner

JOINT LOW-BAND AND HIGH-BAND OPERATION IN NR-SS

CROSS-REFERENCE TO RELATED APPLICATIONS

This application claims the benefit of U.S. Provisional Patent Application No. 62/613,613, entitled, "JOINT LOW-BAND AND HIGH-BAND OPERATION IN NR-SS," filed on Jan. 4, 2018, which is expressly incorporated by reference herein in its entirety.

BACKGROUND

Field

Aspects of the present disclosure relate generally to wireless communication systems, and more particularly, to joint low-band and high-band operation in new radio (NR) shared spectrum (NR-SS).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes searching, by a UE, each of one or both of: a low-band spectrum and a high-band spectrum for a system information signal including a low-band random access configuration and a high-band random access configuration, transmitting, by the UE, a random access request on a first band spectrum, receiving, by the UE, a random access response from at least one cell on a second band spectrum different from the first band spectrum, transmitting, by the UE, an uplink message based on the random access response on the first band spectrum to a selected cell of the at least one cell, and receiving, by the UE, a contention resolution message from the selected cell on the second band spectrum, wherein the first band spectrum corresponds to one of the low-band spectrum or the high-band spectrum, and the second band spectrum corresponds to the other one of the high-band spectrum or the low-band spectrum.

In an additional aspect of the disclosure, an apparatus configured for wireless communications includes means for searching, by a UE, each of one or both of: a low-band spectrum and a high-band spectrum for a system information signal including a low-band random access configuration and a high-band random access configuration, means for transmitting, by the UE, a random access request on a first band spectrum, means for receiving, by the UE, a random access response from at least one cell on a second band spectrum different from the first band spectrum, means for transmitting, by the UE, an uplink message based on the random access response on the first band spectrum to a selected cell of the at least one cell, and means for receiving, by the UE, a contention resolution message from the selected cell on the second band spectrum, wherein the first band spectrum corresponds to one of the low-band spectrum or the high-band spectrum, and the second band spectrum corresponds to the other one of the high-band spectrum or the low-band spectrum.

In an additional aspect of the disclosure, a non-transitory computer-readable medium having program code recorded thereon. The program code further includes code to search, by a UE, each of one or both of: a low-band spectrum and a high-band spectrum for a system information signal including a low-band random access configuration and a high-band random access configuration, code to transmit, by the UE, a random access request on a first band spectrum, code to receive, by the UE, a random access response from at least one cell on a second band spectrum different from the first band spectrum, code to transmit, by the UE, an uplink message based on the random access response on the first band spectrum to a selected cell of the at least one cell, and code to receive, by the UE, a contention resolution message from the selected cell on the second band spectrum, wherein the first band spectrum corresponds to one of the low-band spectrum or the high-band spectrum, and the second band spectrum corresponds to the other one of the high-band spectrum or the low-band spectrum.

In an additional aspect of the disclosure, an apparatus configured for wireless communication is disclosed. The apparatus includes at least one processor, and a memory coupled to the processor. The processor is configured to search, by a UE, each of one or both of: a low-band spectrum and a high-band spectrum for a system information signal including a low-band random access configuration and a high-band random access configuration, to transmit, by the UE, a random access request on a first band spectrum, to receive, by the UE, a random access response from at least one cell on a second band spectrum different from the first band spectrum, to transmit, by the UE, an uplink message based on the random access response on the first band spectrum to a selected cell of the at least one cell, and to receive, by the UE, a contention resolution message from the selected cell on the second band spectrum, wherein the first band spectrum corresponds to one of the low-band spectrum or the high-band spectrum, and the second band spectrum corresponds to the other one of the high-band spectrum or the low-band spectrum.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
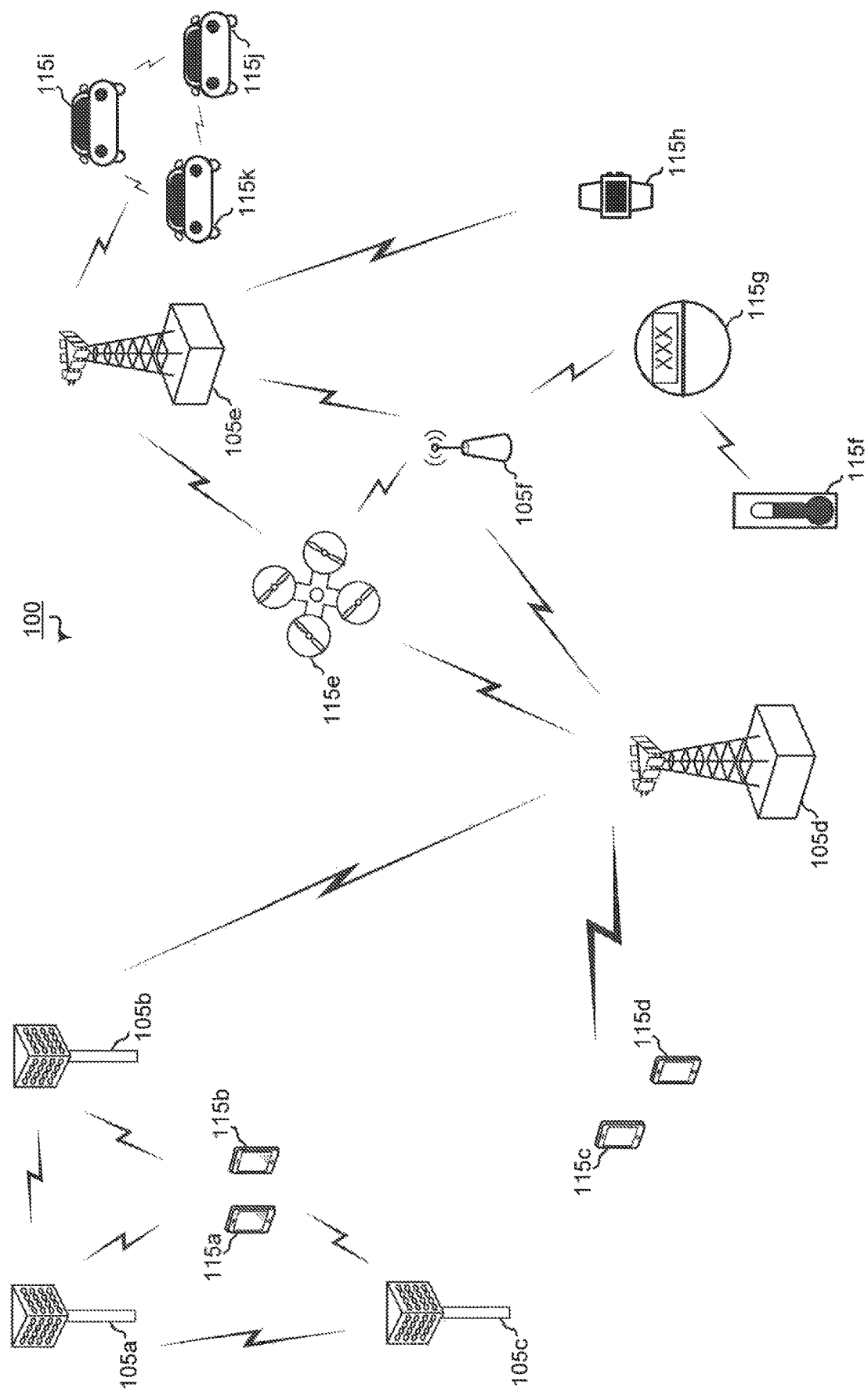
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
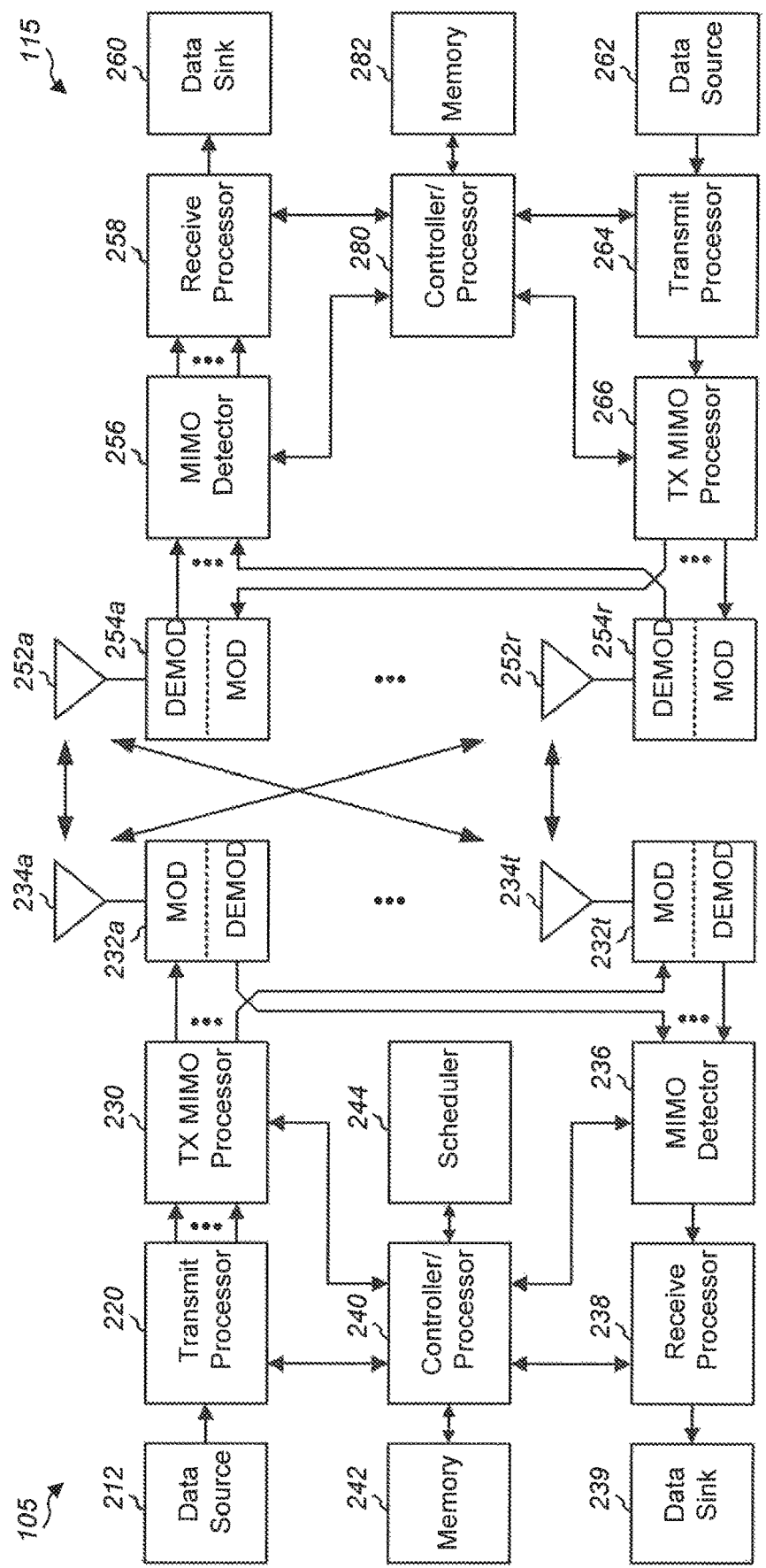
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4 and 7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
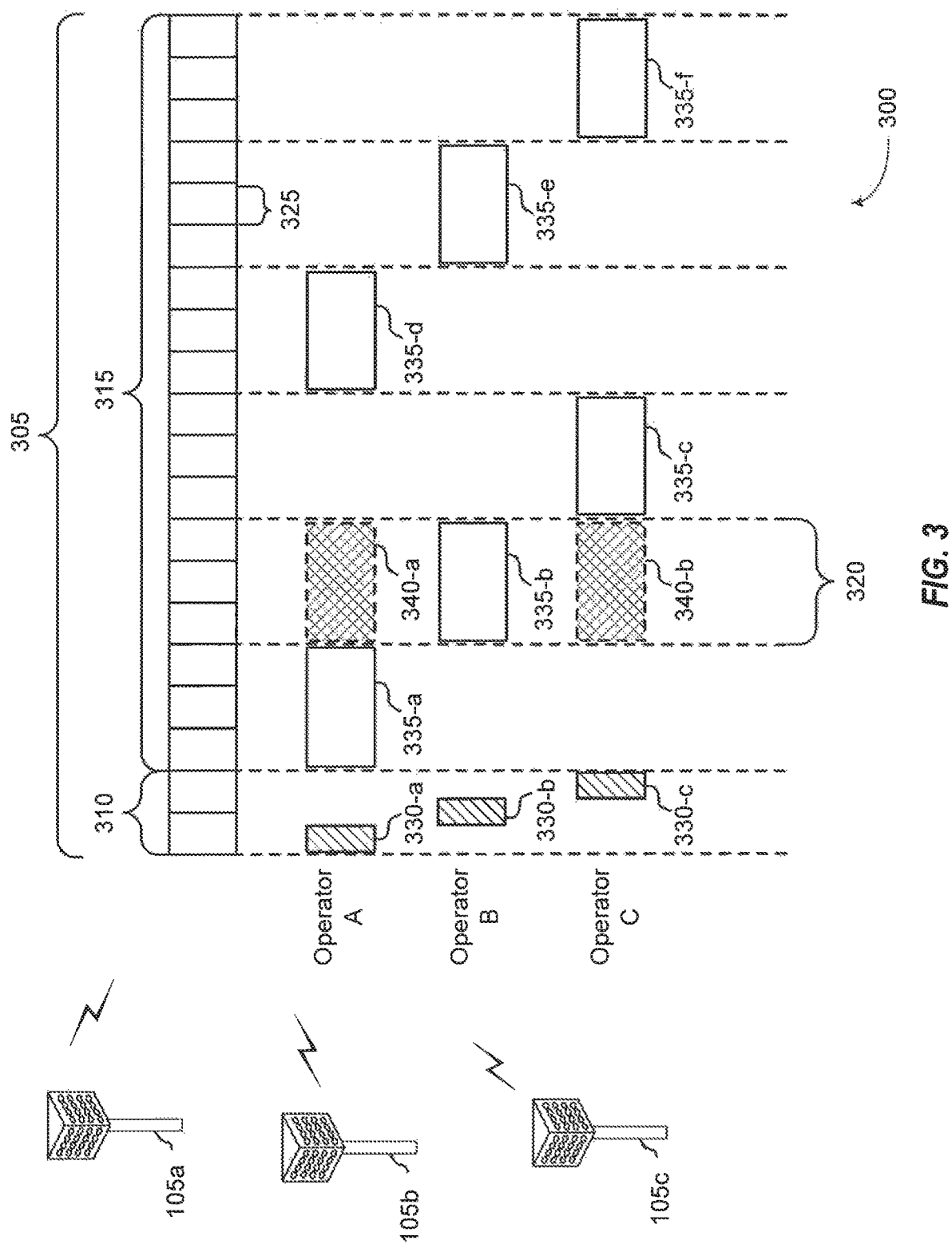
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Providing communications using mmW Standalone operation on a UE may come with multiple challenges. For example, the network is constrained by uplink link budget and other deployment constraints, while on the device, service may be constrained due to power dissipation, MPE constraints, and the like. 3GPP Rel. 15 suggests an initial set of deployment constraints via a non-standard aggregation (NSA), using an LTE (on low-band)+NR (on mmW high-band) dual connectivity or NR (on low-band)+NR (on mmW high-band) carrier aggregation or dual connectivity. The dual connectivity model implies independent operation of the NR and LTE carriers. However, licensed low-band spectrum for NR may be scarce in some markets—e.g., the US. Therefore, the unlicensed low-band carrier anchored with a high-band mmW carrier has been proposed to address challenges on the network and device present in high-band mmW Standalone operations. In such an aggregated system, the UE maintains connectivity (coverage) with the primary cell operating on the low-band, while opportunistically activating the high-band mmW when desired, in order to minimize the power draw on the UE.

However, unlike the licensed low band, the unlicensed low-band may not be robust enough or may be subject to a high latency because of the medium access constraints. A node may not be able to transmit or may not be able to receive with high reliability due to repeated unsuccessful LBT or high interference. In contrast, the LBT and interference constraints are less severe in the high-band mmW due to its narrow beamforming. With these better access parameters, it may be beneficial to allow the UE to access the system via either low-band or high-band or a combination of both without simply relying on the low-band as the anchor carrier. The various aspects of the present disclosure are directed to providing a joint low-band and high-band operation.

Figure 4:
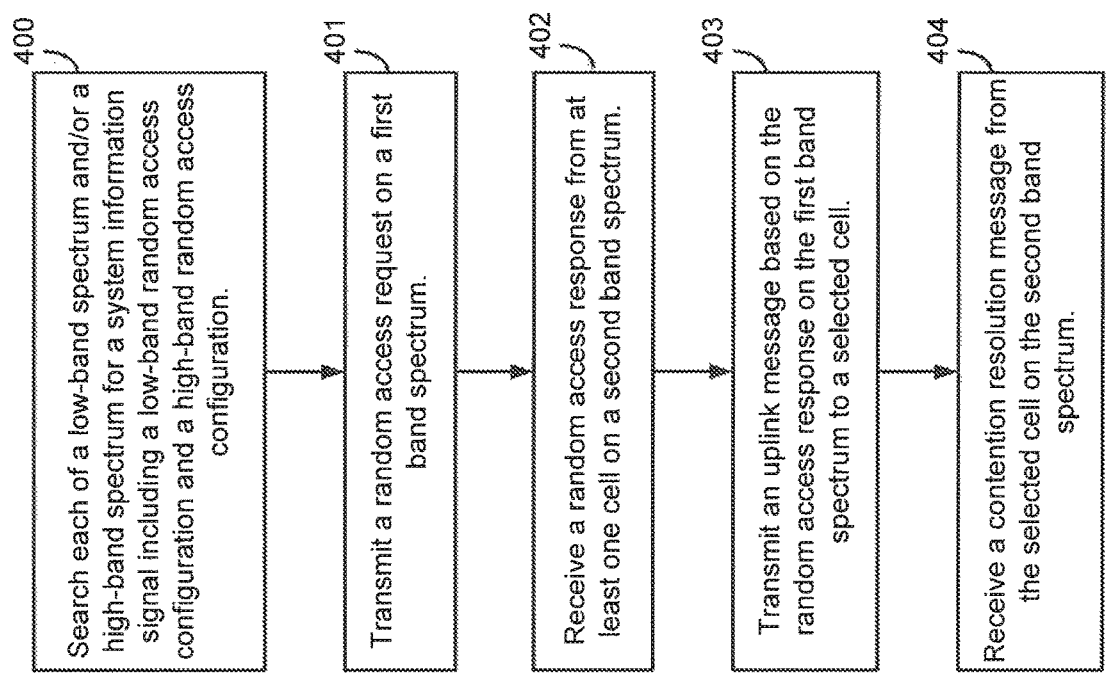
FIG. 4 is a block diagram illustrating example blocks executed to implement one aspect of the present disclosure.
Figure 8:
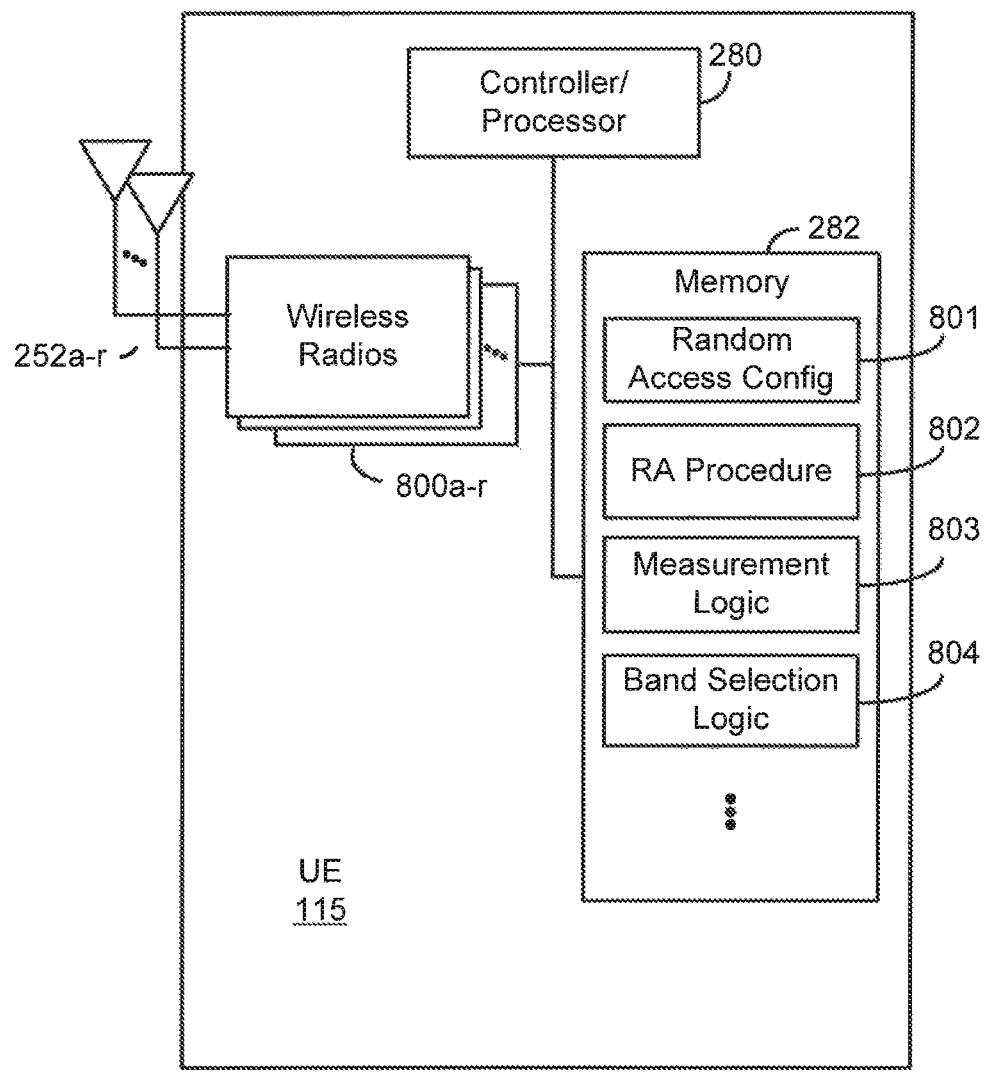
FIG. 8 is a block diagram illustrating an example UE configured according to aspects of the present disclosure.

FIG. 4 is a block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE searches each of one or both of the low-band spectrum and high-band spectrum for a system information signal including both the low-band and high-band random access configurations. For example, a UE, such as UE 115, receives signals via the low- and high-bands using antennas 252a-r and wireless radios 800a-r. After decoding the signals, under control of controller/processor 280, UE 115 may determine the system information signals contained within the received signals.

At block 401, the UE transmits a random access request on a first band spectrum. When UE 115 determines to gain access to the wireless network, it executes, under control of controller/processor 280, random access procedure 802, stored in memory 282. The execution environment of random access procedure 802 provides the procedural steps in exchanging random access messages with the target base station. UE 115 would, thus, transmit the random access request, Msg 1, using wireless radios 800a-r and antennas 252a-r.

At block 402, the UE receives a random access response from at least one cell on a second band spectrum different from the first band spectrum. UE 115 receives the random access response from the cell or cells via antennas 252a-r and wireless radios 800a-r.

At block 403, the UE transmits an uplink message based on the random access response on the first band spectrum to a selected cell of the at least one cell. Within the execution environment of random access procedure 802, UE 115, under control of controller/processor 280 uses the random access response to generate the uplink message, Msg 3, which includes the UE ID. UE 115 transmits Msg3 using wireless radios 800a-r and antennas 252a-r.

At block 404, the UE receives a contention resolution message from the selected cell on the second band spectrum, wherein the first band spectrum corresponds to one of the low-band spectrum or the high-band spectrum, and the second band spectrum corresponds to the other one of the high-band spectrum or the low-band spectrum. UE 115 receives the contention resolution from the selected cell via antennas 252a-r and wireless radios 800a-r.

In additional aspects of the present disclosure, a UE may be able to access the system via one of the following combinations: Low-band downlink and low-band uplink; Low-band downlink and high-band uplink; High-band downlink and high-band uplink; High-band downlink and low-band uplink. Both band's broadcast of remaining minimum system information (RMSI) includes the random access channel (RACH) configuration for both low-band and high-band uplink in order to allow uplink access in both the low-band and high-band. Thus, whether the UE successfully accesses the RMSI on either of the low-band or high-band broadcasts, it will receive the RACH configuration for uplink access on both bands.

The uplink random access resources for the low-band may be different to differentiate the UE sending PRACH via low-band and preferring downlink via the low-band also. In this case, the current low-band random access procedure can be applied. Differences arise, however, where the UE sends PRACH on the low-band, while preferring downlink via the high-band. This scenario may arise when the UE cannot secure the uplink or close the uplink in the high-band and instead uses the low-band for uplink transmissions. Another scenario may arise when the low-band base station may not be able to successfully complete the LBT during the discovery measurement timing configuration (DMTC) window to transmit the discovery reference signal (DRS) and instead relies on the mmW high-band to transmit DRS.

Figure 5B:
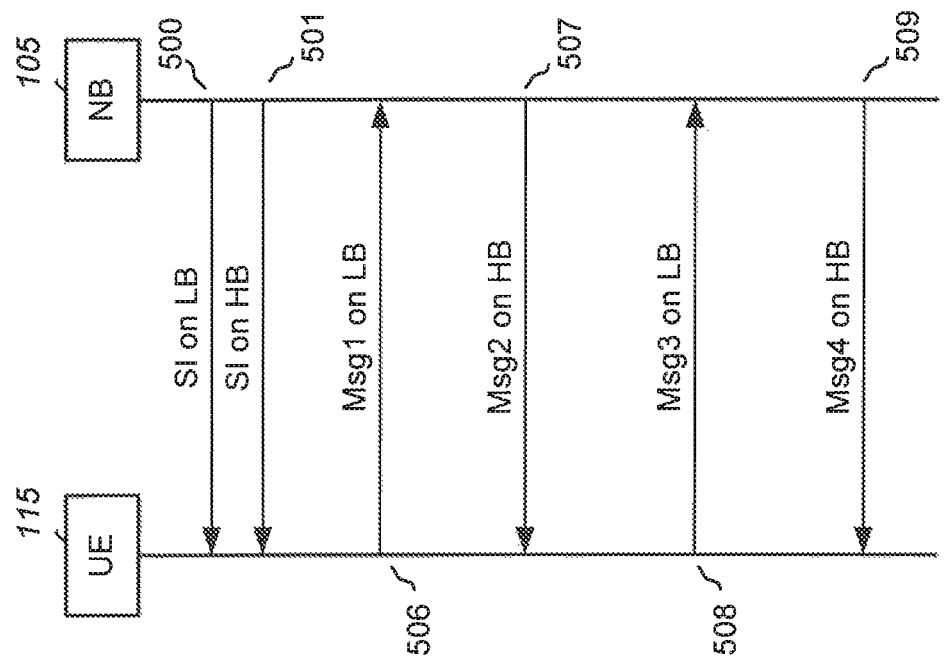
FIGS. 5A and 5B are call flow diagrams illustrating communications between a UE and base station, each configured according to one aspect of the present disclosure.
Figure 5A:
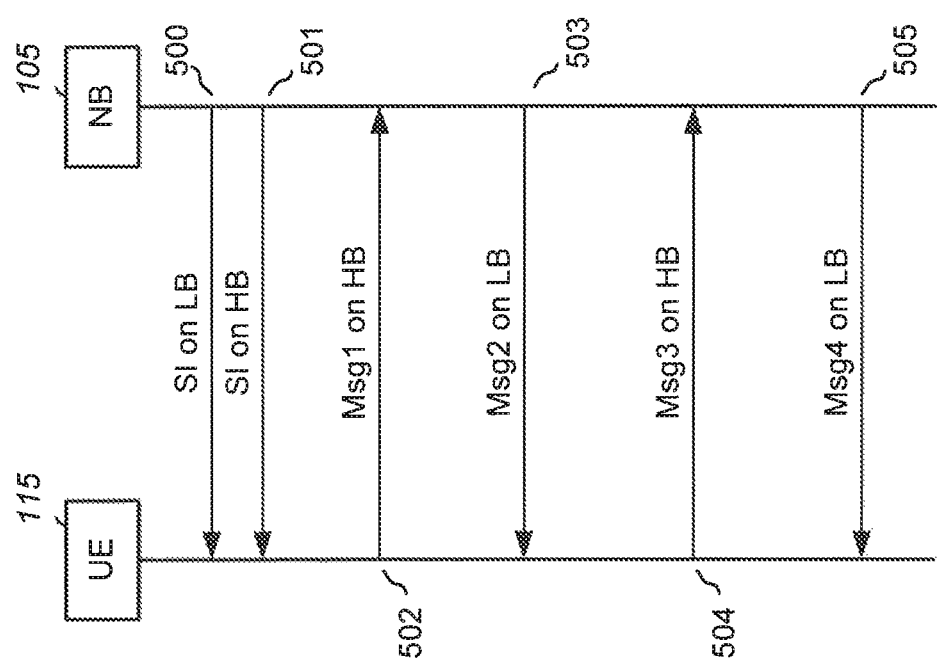

FIG. 5A is a call flow diagram illustrating communications between a UE 115 and base station 105, each configured according to one aspect of the present disclosure. Base station 105 broadcasts system information, such as via MIB, SIB, RMSI, and the like, at 500 on the low-band and at 501 on the high-band. Each transmitted system information message includes the random access configuration for uplink on both the low-band and high-band mmW.

At 502, UE 115 determines that the conditions for uplink access on the low-band are not desirable, and when it determines to gain access to the system, transmits the random access request, Msg1, via mmW on the high-band. UE 115 uses the uplink random access configuration information received via the system information for the high-band transmission. Base station 105 responds, at 503, with the random access response, Msg2, via the low-band. Base station 105 has determined that downlink access is preferable via the low-band for transmitting Msg2. At block 504, UE 115 transmits the uplink message based on the random access response, Msg3, which would typically include the UE identifier (UE-ID). UE 115 continues transmitting its uplink messages using the mmW high-band, as the preferable band. At 505, base station 105 completes the random access procedure by transmitting the contention resolution message, Msg4, via the low-band. UE 115 would resolve the contention resolution message and begin communications via base station 105.

FIG. 5B is a call-flow diagram illustrating communications between a UE 115 and base station 105, each configured according to one aspect of the present disclosure. The example communication operations between UE 115 and base station 105 are similar to those described in FIG. 5A, except that UE 115 determines that its uplink transmissions may be more favorable using the low-band and receiving the downlink transmissions may be more favorable using the high-band. As with the example of FIG. 5A, base station 105 broadcasts system information, such as via MIB, SIB, RMSI, and the like, at 500 on the low-band and at 501 on the high-band. Each transmitted system information message includes the random access configuration for uplink on both the low-band and high-band mmW.

At 506, UE 115 determines that the conditions for uplink access on the high-band are not desirable, and when it determines to gain access to the system, transmits the random access request, Msg1, via the low-band. UE 115 uses the uplink random access configuration information received via the system information for the low-band transmission. Base station 105 responds, at 507, with the random access response, Msg2, via the mmW high-band. At block 508, UE 115 transmits the uplink message based on the random access response, Msg3 using the low-band. At 509, base station 105 completes the random access procedure by transmitting the contention resolution message, Msg4, via the mmW high-band. UE 115 would again resolve the contention resolution message and begin communications via base station 105.

For the random access resources corresponding to the high-band, the low-band may allocate different random access resources corresponding to different beams in the high-band so that the base station or base stations can send the random access response, Msg2, via the high-band with the corresponding downlink beam. Alternatively, the random access resources for the low-band may not necessarily differentiate between different beams. In such scenarios, the random access response, Msg2, from the base station(s) may be transmitted via multiple high-band beams. The UE would indicate which of the Msg 2 beams it selects by transmitting the beam identifier (ID) of the Msg2 beam in the uplink message, Msg3. The base station(s) may then transmit the contention resolution message, Msg4, using the corresponding downlink high-band beam.

Figure 6B:
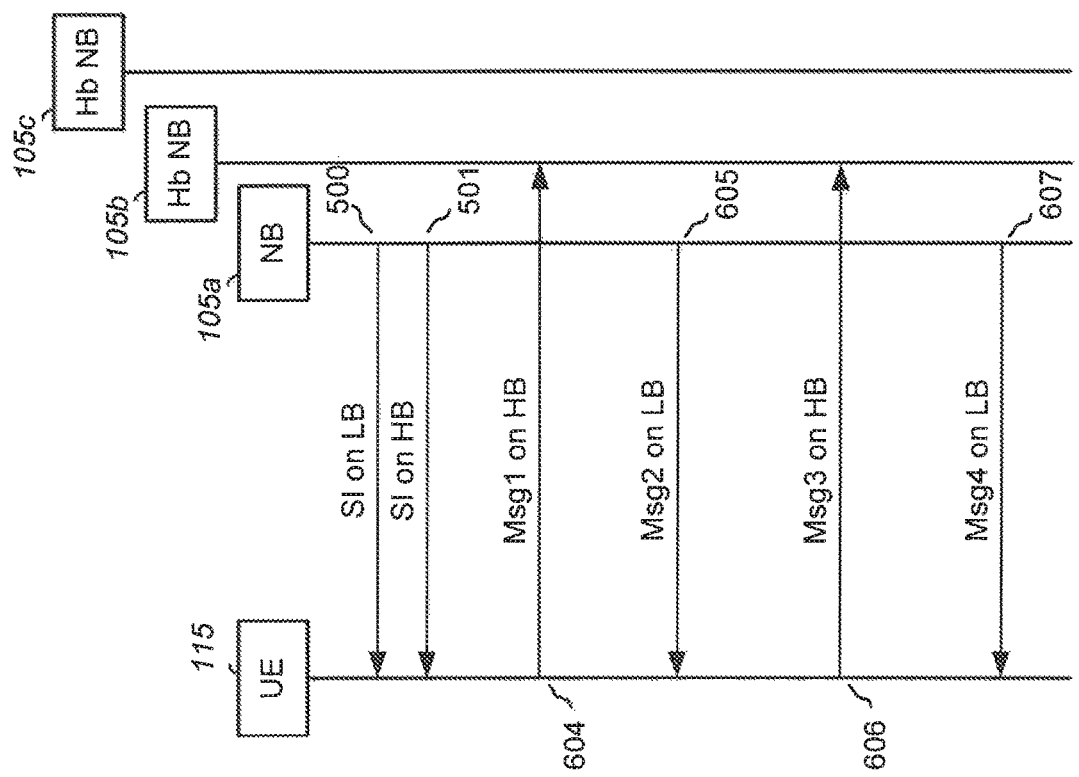
FIGS. 6A-6C are call flow diagrams illustrating communications between a UE and base station, each configured according to one aspect of the present disclosure.
Figure 6A:
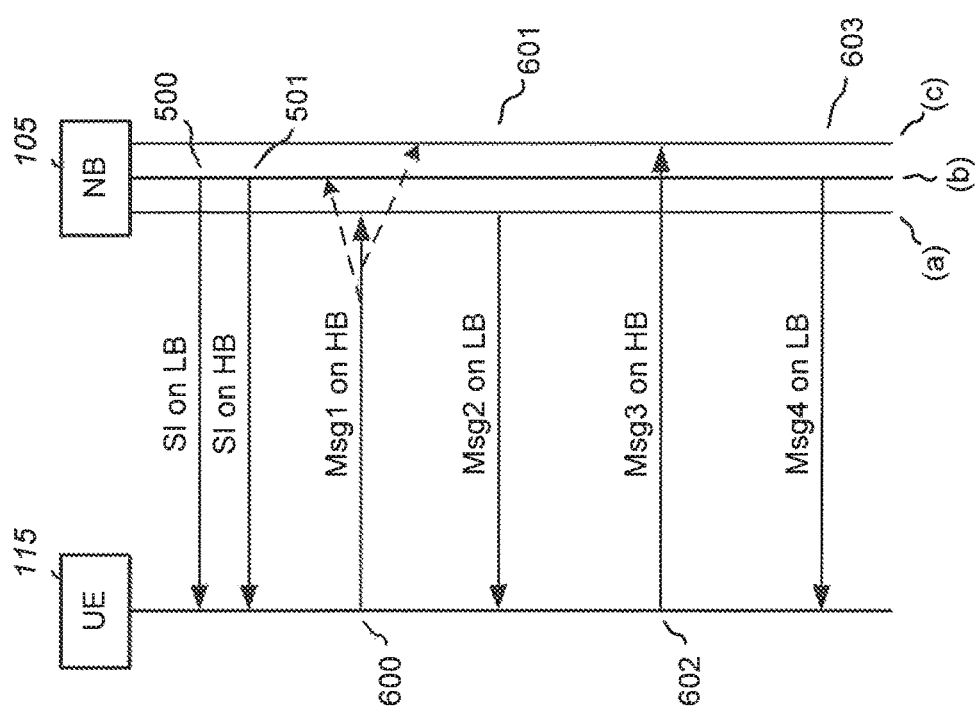

FIG. 6A is a call-flow diagram illustrating communications between a UE 115 and base station 105, each configured according to one aspect of the present disclosure. The example communication operations between UE 115 and base station 105 are similar to those described in FIGS. 5A and 5B, as base station 105 broadcasts system information, such as via MIB, SIB, RMSI, and the like, at 500 on the low-band and at 501 on the high-band. Each transmitted system information message includes the random access configuration for uplink on both the low-band and high-band mmW.

At 600, UE 115 determines to transmit the random access request using the high-band and preferring the low-band for downlink communications. As before, UE 115 determines the random access configuration for the high-band from the configuration information received at either 500 or 501 on the system information message. Furthermore, the random access configuration information received at 500 or 501 may also differentiate between beams a, b, or c of the high-band. UE 115 would specifically select the configuration information for band a to send Msg1, such that base station 105 would use the corresponding beam for Msg1 reception. Base station 105 would send the random access response Msg2 on the low-band at 601. At 602, using information from Msg2, UE 115 sends the uplink Msg3 including an identification of UE 115. Base station 105 then sends the contention resolution message, Msg 4 on the low-band at 603. UE 115 resolves the contention resolution message and begins communications.

It should be noted that in alternative aspects, instead of sending differentiating random access configuration information within the system information at 500 and 501, the random access configuration information may not differentiate base station 105's receive beams, and, instead, at 600, the random access preamble, Msg1, is transmitted multiple times where base station 105 could sweep each of high-band beams a, b, and c for Msg1 reception. Base station 105 would then use the corresponding receive beam to receive Msg3 from UE 115 accordingly. Base station 105 completes the random access procedure by transmitting the contention resolution message, Msg4, at 603 using the low-band. UE 115 would again resolve the contention resolution message and begins communications. In addition, base station 105 may further conduct the beam refinement later on when UE 115 gets connected.

In additional aspects, the low-band base station may be within the coverage area of multiple high-band mmW cells. The random access resources for the high-band may, therefore, differentiate between the different mmW cells, or, the multiple mmW cells would transmit their own Msg2. The UE would then indicate which mmW cell it selected by including the mmW cell ID in Msg3. The selected mmW cell can then transmit Msg4 accordingly. It should be noted that the random access response (RAR) response window and contention resolution window may also be different depending on UE is accessing either high-band or low-band or gNB is using high-band or low-band to send Msg2 and Msg4.

FIG. 6B is a call-flow diagram illustrating communications between a UE 115 and base station 105, each configured according to one aspect of the present disclosure. The example communication operations between UE 115 and base station 105 are similar to those described in FIGS. 5A, 5B, and 6A as base station 105 broadcasts system information, such as via MIB, SIB, RMSI, and the like, at 500 on the low-band and at 501 on the high-band. Each transmitted system information message includes the random access configuration for uplink on both the low-band and high-band mmW.

At 604, UE 115 determines to transmit the random access request using the high-band and preferring the low-band for downlink communications. As before, UE 115 determines the random access configuration for the high-band from the configuration information received at either 500 or 501 on the system information message. Furthermore, the random access configuration information received at 500 or 501 may also differentiate between the different high-band base stations 105*b* and 105*c*. UE 115 would specifically select the configuration information for transmitting Msg1 to base station 105*b* via the mmW high-band. Base station 105*a* transmits the random access response (RAR), Msg2, on the low-band at 605. Base station 105*a* communicates via back-haul or other connection with the high-band base stations 105*b* and 105*c*. Thus, the information obtained at base station 105*b* via the high-band, would be communicated to base station 105*a* for formulating Msg2.

When using differentiating random access configuration information, UE 115, at 606, transmits Msg3 to high-band base station 105*b*. Base station 105*a* would then complete the random access procedure by transmitting the contention resolution message, Msg4, on the low-band at 607. The information UE 115 sent to high-band base station 105*b* in Msg3 would be communicated from base station 105*b* to base station 105*a* for generating the contention resolution message, Msg4. UE 115 would again resolve the contention resolution message and begin communications.

Similarly, the uplink RACH resources in high-band may be different to differentiate the following two cases: case one, where UE 115 sends RACH on high-band and it prefers downlink in low-band; while case two, where UE 115 sends RACH on high-band and it prefers downlink in high-band.

It should be noted that UE 115 selecting high-band for uplink and low-band for downlink may occur when UE 115 cannot successfully complete LBT on the low-band, but the base station can transmit DRS on the low-band. In this case, UE 115 may search for the synchronization signal blocks (SSBs) on the high-band to determine the random access resources for the corresponding receive beam on the base station. In case the high-band base station, such as high-band base stations 105*b* and 105*c*, cannot transmit SSB due to LBT failure during the DMTC window or because of MPE constraint, UE 115 may not be able to send PRACH with the corresponding receive beam. In this case, UE 115 may transmit multiple Msg1 (alternatively indicated in FIG. 6A at 600 via dotted line) to allow base station 105 to determine the proper receive beam. Subsequently, base station 105 may trigger UE 115 to transmit multiple sounding reference signals (SRS) (not shown) for uplink receive beam refinement. Where UE 115 prefers both uplink and downlink using the mmW high-band, the current mmW RACH procedures may apply. As above, it should be noted that in alternative example aspects, the RAR response window and contention resolution window may also be different in these two cases.

Figure 6C:
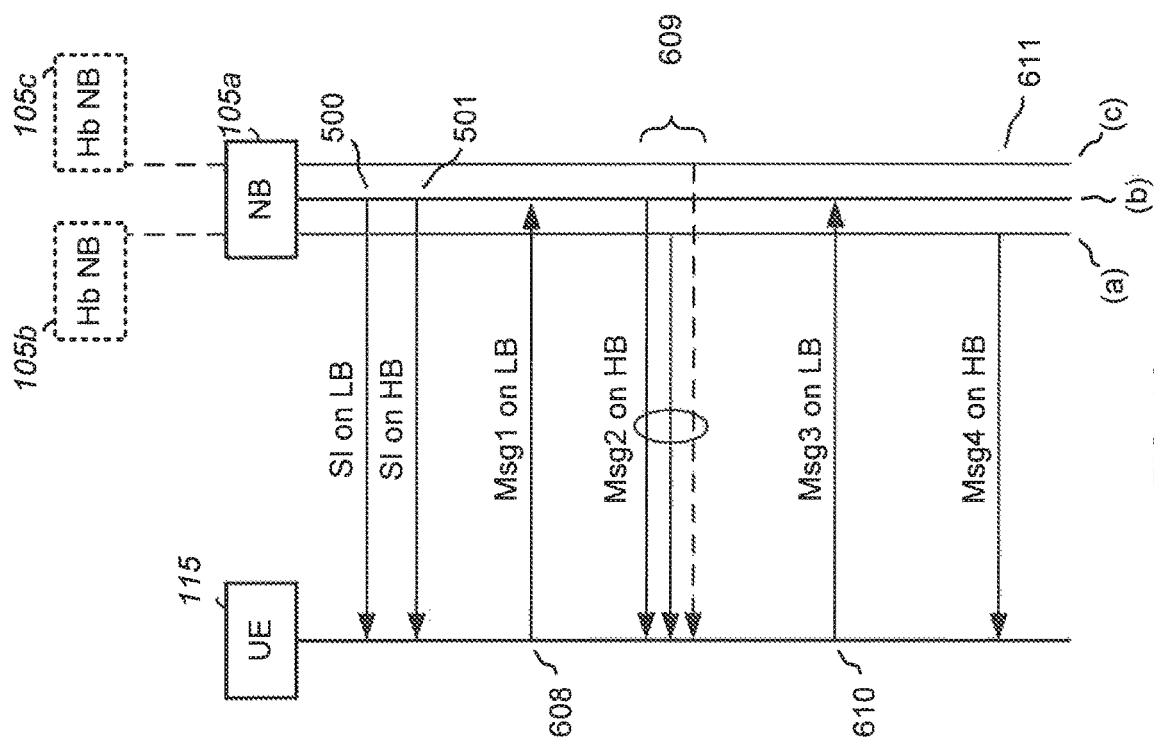

FIG. 6C is a call-flow diagram illustrating communications between a UE 115 and base station 105*a*, and alternatively base stations 105*b* and 105*c*, each configured according to one aspect of the present disclosure. The example communication operations between UE 115 and base stations 105*a*-105*c* are similar to those described in FIGS. 5A, 5B, 6A, and 6B as base station 105*a* broadcasts system information, such as via MIB, SIB, RMSI, and the like, at 500 on the low-band and at 501 on the high-band. Each transmitted system information message includes the random access configuration for uplink on both the low-band and high-band mmW.

At 608, UE 115 determines to transmit the random access request using the low-band and preferring the high-band for downlink communications. UE 115 determines the random access configuration for the low-band from the configuration information received at either 500 or 501 on the system information message. According to the random access configuration illustrated in FIG. 6C, the random access response (RAR), Msg2, may be transmitted at 609 from multiple high-band mmW beams (a, b, c). The multiple beams may be transmitted by the same base station 105*a* or may be transmitted by multiple high-band mmW base stations 105*b* and 105*c*, within the coverage area of base station 105*a*. UE 115 would select which of the beams a, b, or c, it prefers to begin communications, and transmit the beam index or selection information in its uplink Msg 3 on the low-band at 610. During the process, base station 105*a* determines that base station 105*c* no longer may offer adequate communications for UE 115 (e.g., signal quality, load, etc.). Base station 105*a* then directs base station 105*b* to take over downlink communications. Accordingly, base station 105*c* would then complete the process by transmitting the contention resolution message, Msg4, using information received from base station 105*a*, at 611. UE 115 would again resolve the contention resolution message and begin communications.

In additional or alternative aspects, the random access configuration may provide for a specific beam for Msg2 (e.g., beam c). That is, by detecting the Msg1 transmission on different random access resources, base station 105*a* is aware of which beam may be suitable for Msg2 transmission. Thus, Msg2, is sent over beam c, either by base station 105*a*, in a single base station scenario, or by base station 105*b* and 105*c*, in multiple base station scenario. UE 115 would receive Msg2 on beam c and transmit its Msg3 on the low-band to base station 105*a*. UE 115 may further indicate that its prefers high-band mmW cell (105*c*) in Msg3 in the multiple base station scenario.

In yet another alternative aspect, the random access configuration may provide for a specific beam for Msg2 with a specific high-band mmW base station (e.g., beam c from base station 105*c*). That is, by detecting the Msg1 transmission on different random access resources, base station 105*a* is aware of which beam from which base station (e.g., base station 105*c*) is suitable for Msg2 transmission. Thus, base station 105*c* transmits Msg2 over beam c, in multiple base station scenario. UE 115 would receive Msg2 on beam c from base station 105*c* and transmit its Msg3 on the low-band to base station 105*a*.

Figure 7:
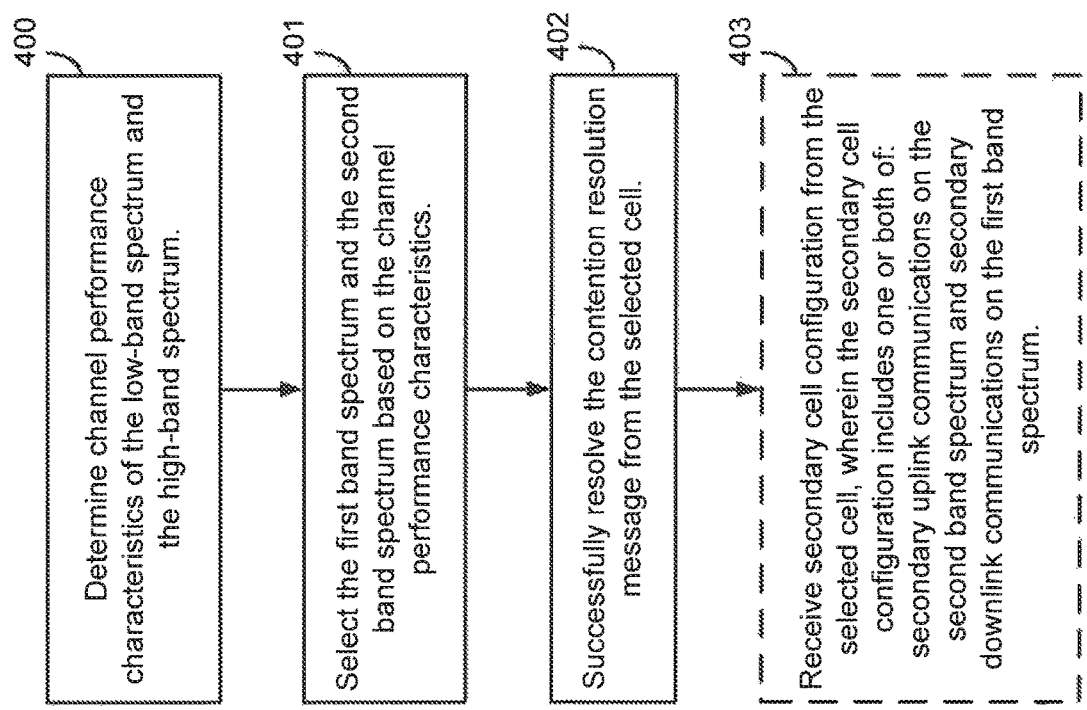
FIG. 7 is a block diagram illustrating example blocks executed to implement one aspect of the present disclosure.

FIG. 7 is a block diagram illustrating example blocks executed to implement one aspect of the present disclosure. The example blocks will also be described with respect to UE 115 as illustrated in FIG. 8. At block 700, a UE determines channel performance characteristics of the low-band spectrum and the high-band spectrum. UE 115, executes, under control of controller/processor 280, measurement logic 803, stored in memory 282. The execution environment of measurement logic 803 allows UE 115 to determine the channel performance characteristics such as the downlink path loss, LBT statistics, and the like.

At block 701, the UE selects the first band spectrum and the second band spectrum based on the channel performance characteristics. UE 115, under control of controller/processor 280, executes band selection logic 804, stored in memory 282. The execution environment of band selection logic 804 allows UE 115 to select the downlink carrier band based on channel performance characteristics, such as the downlink path loss, as well as the LBT statistics (e.g., the load of the channel or the preamble it observed, etc). Similarly, UE 115 may select the uplink carrier band for initial access based on these channel performance characteristics.

At block 702, the UE successfully resolves contention resolution message from the selected cell. Within the execution environment of random access procedure 802, UE 115 may successfully resolve the contention resolution message to begin communications. If UE 115 starts its RACH procedure on the downlink with carrier A and uplink with carrier B, then the RACH procedure may be completed with all downlink transmission taking place on carrier A and all uplink transmissions taking place on carrier B. The primary cell would consist of the downlink carrier A and the uplink carrier B in this case.

Block 703 is an alternative block. Where the network determines to configure a secondary cell for the UE, the UE may receive secondary cell configuration at block 703 from the selected cell, wherein the secondary cell configuration includes one or both of: secondary uplink communications on the second band spectrum and secondary downlink communications on the first band spectrum. Once UE 115 gets connected on the primary cell: downlink carrier A and uplink carrier B, the serving base station may configure downlink on carrier B and/or uplink on carrier A as the secondary cell. The network may, thereafter, change the UE 115's primary cell by handing UE 115 over to downlink on carrier B and/or uplink on carrier A, as needed, wherein carrier A may or may not be equal to carrier B.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
searching, by a user equipment (UE), both of: a low-band spectrum and a high-band spectrum for a system information signal including a low-band random access configuration and a high-band random access configuration;
transmitting, by the UE, a random access request on a first band spectrum;
receiving, by the UE, a random access response from at least one cell on a second band spectrum different from the first band spectrum;
transmitting, by the UE, an uplink message based on the random access response on the first band spectrum to a selected cell of the at least one cell; and
receiving, by the UE, a contention resolution message from the selected cell on the second band spectrum, wherein the first band spectrum corresponds to one of the low-band spectrum or the high-band spectrum, and the second band spectrum corresponds to the other one of the high-band spectrum or the low-band spectrum.

2. The method of claim 1,
wherein the high-band random access configuration includes a random access configuration for a plurality of high-band beams,
wherein the random access response is received by the UE on one of the plurality of high-band beams, and
wherein the first band spectrum corresponds to the low-band spectrum, and the second band spectrum corresponds to the high-band spectrum.

3. The method of claim 2, wherein the plurality of high-band beams are operated by an associated plurality of high-band cells.

4. The method of claim 1, wherein the UE receives the random access response on each of a plurality of beams of the high-band spectrum, the method further including:
selecting, by the UE, the random access response associated with a favorable beam having a best transmission characteristics of the plurality of beams, wherein the UE identification signal includes a beam index of the favorable beam and the contention resolution message is received from the selected cell on the favorable beam,
wherein the first band spectrum corresponds to the low-band spectrum, and the second band spectrum corresponds to the high-band spectrum.

5. The method of claim 4, wherein the plurality of beams are operated by an associated plurality of high-band cells within the high-band spectrum.

6. The method of claim 1, wherein the obtaining the high-band random access configuration via the high-band spectrum includes:
searching a synchronization signal block of the system information signal on the high-band spectrum to determine the high-band random access configuration.

7. The method of claim 6, further including:
failing, by the UE, to discover the synchronization signal block in the searching,
wherein the transmitting the random access request includes transmitting the random access request on a plurality of beams of the high-band spectrum, and
wherein the receiving the random access response on the at least one cell includes receiving the random access response on at least one beam of the plurality of beams.

8. The method of claim 7, further including:
receiving, by the UE, a sounding trigger from the selected cell; and
transmitting, by the UE, a sounding reference signal on the at least one beam to the selected cell.

9. The method of claim 1, further including:
determining, by the UE, channel performance characteristics of the low-band spectrum and the high-band spectrum; and
selecting, by the UE, the first band spectrum and the second band spectrum based on the channel performance characteristics.

10. The method of claim 9, further including:
successfully resolving, by the UE, the contention resolution message from the selected cell;
establishing, by the UE, uplink communications on the first band spectrum and downlink communications on the second band spectrum; and
receiving, by the UE, secondary cell configuration from the selected cell, wherein the secondary cell configuration includes one or both of: secondary uplink communications on the second band spectrum and secondary downlink communications on the first band spectrum.

11. The method of claim 10, further comprising:
receiving, by the UE, a cell reconfiguration message, wherein the cell reconfiguration message reconfigures a band spectrum of one or more of: the uplink communications, the downlink communications, the secondary uplink communications, and the secondary downlink communications.

12. An apparatus configured for wireless communication, comprising:
means for searching, by a user equipment (UE), both of: a low-band spectrum and a high-band spectrum for a system information signal including a low-band random access configuration and a high-band random access configuration;
means for transmitting, by the UE, a random access request on a first band spectrum;
means for receiving, by the UE, a random access response from at least one cell on a second band spectrum different from the first band spectrum;
means for transmitting, by the UE, an uplink message based on the random access response on the first band spectrum to a selected cell of the at least one cell; and
means for receiving, by the UE, a contention resolution message from the selected cell on the second band spectrum, wherein the first band spectrum corresponds to one of the low-band spectrum or the high-band spectrum, and the second band spectrum corresponds to the other one of the high-band spectrum or the low-band spectrum.

13. The apparatus of claim 12,
wherein the high-band random access configuration includes a random access configuration for a plurality of high-band beams,
wherein the random access response is received by the UE on one of the plurality of high-band beams, and
wherein the first band spectrum corresponds to the low-band spectrum, and the second band spectrum corresponds to the high-band spectrum.

14. The apparatus of claim 12, wherein the UE receives the random access response on each of a plurality of beams of the high-band spectrum, the apparatus further including:
means for selecting, by the UE, the random access response associated with a favorable beam having a best transmission characteristics of the plurality of beams, wherein the UE identification signal includes a beam index of the favorable beam and the contention resolution message is received from the selected cell on the favorable beam,
wherein the first band spectrum corresponds to the low-band spectrum, and the second band spectrum corresponds to the high-band spectrum.

15. The apparatus of claim 12, wherein the means for obtaining the high-band random access configuration via the high-band spectrum includes:
means for searching a synchronization signal block of the system information signal on the high-band spectrum to determine the high-band random access configuration.

16. The apparatus of claim 15, further including:
means for failing, by the UE, to discover the synchronization signal block in the searching,
wherein the means for transmitting the random access request includes means for transmitting the random access request on a plurality of beams of the high-band spectrum, and
wherein the means for receiving the random access response on the at least one cell includes means for receiving the random access response on at least one beam of the plurality of beams.

17. The apparatus of claim 16, further including:
means for receiving, by the UE, a sounding trigger from the selected cell; and
means for transmitting, by the UE, a sounding reference signal on the at least one beam to the selected cell.

18. The apparatus of claim 12, further including:
means for determining, by the UE, channel performance characteristics of the low-band spectrum and the high-band spectrum; and
means for selecting, by the UE, the first band spectrum and the second band spectrum based on the channel performance characteristics.

19. The apparatus of claim 18, further including:
means for successfully resolving, by the UE, the contention resolution message from the selected cell;
means for establishing, by the UE, uplink communications on the first band spectrum and downlink communications on the second band spectrum; and
means for receiving, by the UE, secondary cell configuration from the selected cell, wherein the secondary cell configuration includes one or both of: secondary uplink communications on the second band spectrum and secondary downlink communications on the first band spectrum.

20. The apparatus of claim 19, further comprising:
means for receiving, by the UE, a cell reconfiguration message, wherein the cell reconfiguration message reconfigures a band spectrum of one or more of: the uplink communications, the downlink communications, the secondary uplink communications, and secondary downlink communications.

21. A non-transitory computer-readable medium having program code recorded thereon, the program code comprising:
program code executable by a computer for causing the computer to search, by a user equipment (UE), both of: a low-band spectrum and a high-band spectrum for a system information signal including a low-band random access configuration and a high-band random access configuration;
program code executable by the computer for causing the computer to transmit, by the UE, a random access request on a first band spectrum;
program code executable by the computer for causing the computer to receive, by the UE, a random access response from at least one cell on a second band spectrum different from the first band spectrum;
program code executable by the computer for causing the computer to transmit, by the UE, an uplink message based on the random access response on the first band spectrum to a selected cell of the at least one cell; and
program code executable by the computer for causing the computer to receive, by the UE, a contention resolution message from the selected cell on the second band spectrum, wherein the first band spectrum corresponds to one of the low-band spectrum or the high-band spectrum, and the second band spectrum corresponds to the other one of the high-band spectrum or the low-band.

22. An apparatus configured for wireless communication, the apparatus comprising:
at least one processor; and
a memory coupled to the at least one processor,
wherein the at least one processor is configured:
to search, by a user equipment (UE), both of: a low-band spectrum and a high-band spectrum for a system information signal including a low-band random access configuration and a high-band random access configuration;
to transmit, by the UE, a random access request on a first band spectrum;
to receive, by the UE, a random access response from at least one cell on a second band spectrum different from the first band spectrum;
to transmit, by the UE, an uplink message based on the random access response on the first band spectrum to a selected cell of the at least one cell; and
to receive, by the UE, a contention resolution message from the selected cell on the second band spectrum, wherein the first band spectrum corresponds to one of the low-band spectrum or the high-band spectrum, and the second band spectrum corresponds to the other one of the high-band spectrum or the low-band spectrum.

23. The apparatus of claim 22,
wherein the high-band random access configuration includes a random access configuration for a plurality of high-band beams, wherein the random access response is received by the UE on one of the plurality of high-band beams, and wherein the first band spectrum corresponds to the low-band spectrum, and the second band spectrum corresponds to the high-band spectrum.

24. The apparatus of claim 22, wherein the UE receives the random access response on each of a plurality of beams of the high-band spectrum, the apparatus further including configuration of the at least one processor to select, by the UE, the random access response associated with a favorable beam having a best transmission characteristics of the plurality of beams, wherein the UE identification signal includes a beam index of the favorable beam and the contention resolution message is received from the selected cell on the favorable beam, wherein the first band spectrum corresponds to the low-band spectrum, and the second band spectrum corresponds to the high-band spectrum.

25. The apparatus of claim 22, wherein the configuration of the at least one processor to obtain the high-band random access configuration via the high-band spectrum includes configuration to search a synchronization signal block of the system information signal on the high-band spectrum to determine the high-band random access configuration.

26. The apparatus of claim 25, further including configuration of the at least one processor:

to fail, by the UE, to discover the synchronization signal block during execution of the configuration of the at least one processor to search, wherein the configuration of the at least one processor to transmit the random access request includes configuration to transmit the random access request on a plurality of beams of the high-band spectrum, and wherein the configuration of the at least one processor to receive the random access response on the at least one cell includes configuration to receive the random access response on at least one beam of the plurality of beams.

27. The apparatus of claim 26, further including configuration of the at least one processor:

to receive, by the UE, a sounding trigger from the selected cell; and to transmit, by the UE, a sounding reference signal on the at least one beam to the selected cell.

28. The apparatus of claim 22, further including configuration of the at least one processor:

to determine, by the UE, channel performance characteristics of the low-band spectrum and the high-band spectrum; and to select, by the UE, the first band spectrum and the second band spectrum based on the channel performance characteristics.

29. The apparatus of claim 28, further including configuration of the at least one processor:

to successfully resolve, by the UE, the contention resolution message from the selected cell;

to establish, by the UE, uplink communications on the first band spectrum and downlink communications on the second band spectrum; and to receive, by the UE, secondary cell configuration from the selected cell, wherein the secondary cell configuration includes one or both of: secondary uplink communications on the second band spectrum and secondary downlink communications on the first band spectrum.

30. The apparatus of claim 29, further comprising configuration of the at least one processor to receive, by the UE, a cell reconfiguration message, wherein the cell reconfiguration message reconfigures a band spectrum of one or more of: the uplink communications, the downlink communications, the secondary uplink communications, and the secondary downlink communications.

\* \* \* \* \*